United States Patent
Roche et al.

(10) Patent No.: US 9,672,112 B2
(45) Date of Patent: Jun. 6, 2017

(54) BACKING UP FIRMWARE DURING INITIALIZATION OF DEVICE

(75) Inventors: John D Roche, Houston, TX (US); Baraneedharan Anbazhagan, Houston, TX (US); Jayne E. Scott, Sugar Land, TX (US); Diep V Nguyen, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 146 days.

(21) Appl. No.: 14/359,067

(22) PCT Filed: Jan. 3, 2012

(86) PCT No.: PCT/US2012/020061
§ 371 (c)(1),
(2), (4) Date: May 16, 2014

(87) PCT Pub. No.: WO2013/103335
PCT Pub. Date: Jul. 11, 2013

(65) Prior Publication Data
US 2014/0325203 A1    Oct. 30, 2014

(51) Int. Cl.
*G06F 9/44* (2006.01)
*G06F 11/14* (2006.01)

(52) U.S. Cl.
CPC ........ *G06F 11/1417* (2013.01); *G06F 9/4401* (2013.01)

(58) Field of Classification Search
CPC .......................... G06F 11/1417; G06F 9/4401
USPC ............................................................. 713/2
See application file for complete search history.

(56) References Cited

U.S. PATENT DOCUMENTS

| | | |
|---|---|---|
| 5,269,022 A | 12/1993 | Shinjo et al. |
| 7,136,994 B2 * | 11/2006 | Zimmer .............. G06F 11/1441 713/1 |
| 7,143,275 B2 | 11/2006 | Cepulis et al. |
| 7,313,685 B2 | 12/2007 | Broyles, III et al. |
| 7,987,353 B2 | 7/2011 | Holdaway et al. |
| 2004/0123086 A1 | 6/2004 | Rothman et al. |
| 2009/0007089 A1 | 1/2009 | Rothman et al. |
| 2010/0005286 A1 | 1/2010 | Wang et al. |
| 2012/0047499 A1 * | 2/2012 | Krzystofczyk ........... G06F 8/63 717/174 |

FOREIGN PATENT DOCUMENTS

| | | |
|---|---|---|
| CN | 1983204 | 6/2007 |
| CN | 101071392 | 11/2007 |
| KR | 10-2009-0124073 | 12/2009 |
| KR | 10-2012-0050062 | 5/2012 |

(Continued)

OTHER PUBLICATIONS

Key Technology Corp; Small storage device with built-in BIOS; Jul. 1, 2003; issued: Aug. 21, 2004.

(Continued)

*Primary Examiner* — Zahid Choudhury
(74) *Attorney, Agent, or Firm* — HP Patent Department

(57) ABSTRACT

Example embodiments disclosed herein relate to backing up firmware. An operating system can be initialized. During the initialization process, memory can be set. The firmware can be backed up to storage based on the set memory.

17 Claims, 3 Drawing Sheets

(56) References Cited

FOREIGN PATENT DOCUMENTS

TW        M241755        8/2004
TW        200713037        4/2007

OTHER PUBLICATIONS

PCT; "Notification of Transmittal of the International Search Report and the Written Opinion of the International Searching Authority, or the Declaration"; cited in PCT/US2012/020061; mailed Sep. 14, 2012; 8 pages.

* cited by examiner

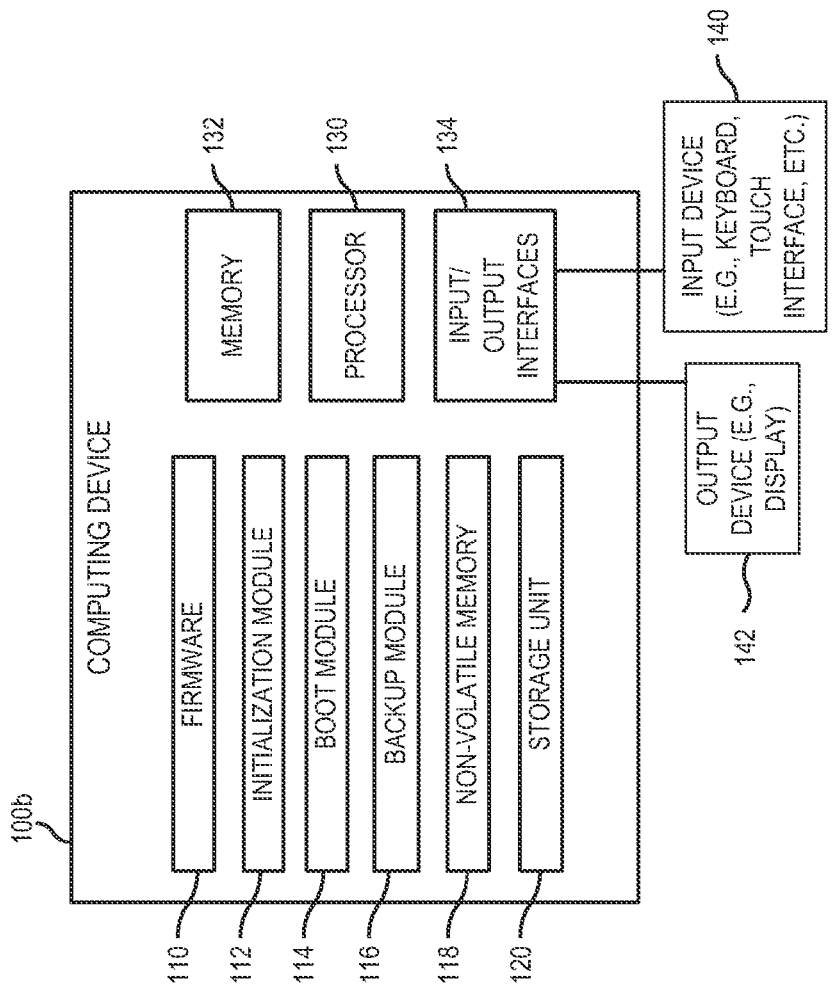
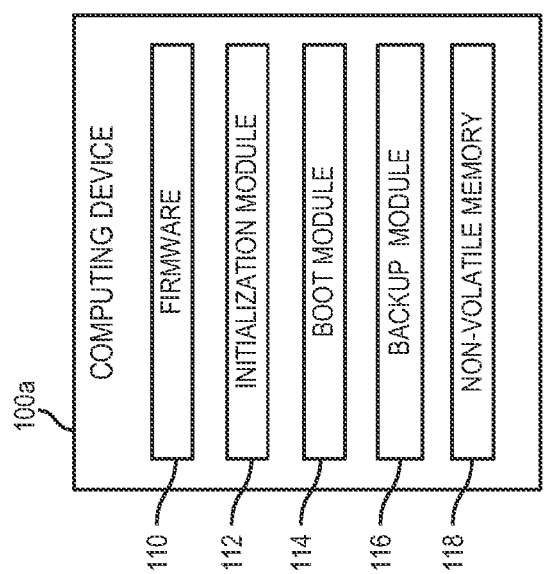
FIG. 1A
FIG. 1B

BACKING UP FIRMWARE DURING INITIALIZATION OF DEVICE

BACKGROUND

Computing devices, such as laptop and desktop computers are used by consumers worldwide. Some of these computing devices are sold as systems including a manufacturer's software bundle. For example, a laptop device may come with an operating system image that is bundled with additional software. When the device first runs, a Basic Input/Output System can be used to boot the system to begin executing instructions of the operating system image.

BRIEF DESCRIPTION OF THE DRAWINGS

The following detailed description references the drawings, wherein:

FIGS. 1A and 1B are block diagrams of computing devices that are capable of backing up firmware to a storage during a boot process if a flag has been set during initialization, according to various examples;

DETAILED DESCRIPTION

Figure 2:
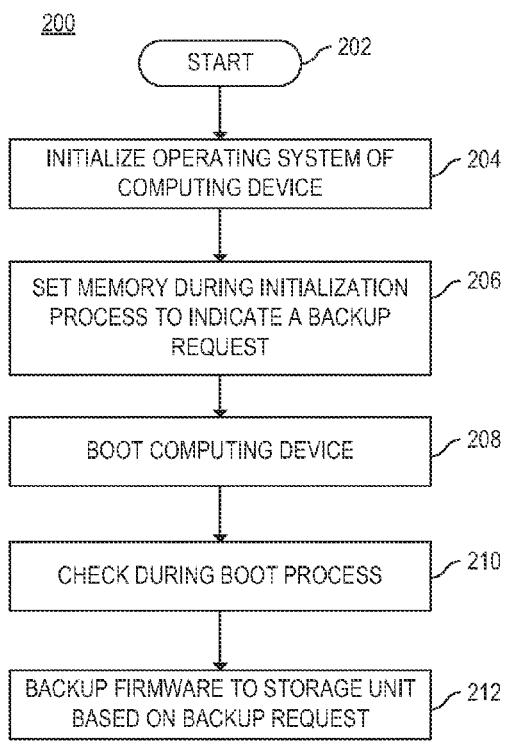
FIG. 2 is a flowchart of a method for backing up firmware based on a request set during an initialization process, according to one example.

Consumers today have many devices, such as laptop computers, desktop computers, all-in-one personal computers, etc. These devices can be bought by a user and manufactured by a manufacturer. The manufacturer can include components, such as a firmware interface, an operating system, other bundled software, a processor or multiple processors, memory, etc. to implement the device.

During manufacturing, various components of the respective devices can include different build or code levels. For example, a firmware interface, such as a basic input/output system (BIOS), may be at one code level, while a software image on a hard drive is at another code level. As such, upgrades can be made independently. When the certain build levels for each of the components is set, the device can be considered ready to ship to a user.

Backup and/or restore features can be added for the device. Examples of backup and/or restore features include a system restore image to be stored on storage such as a hard drive, firmware backup, or the like. In one example, a backup of BIOS can be stored on the hard drive. As such, if a problem with the BIOS arises at a later time, the backup can be used to restore the BIOS and/or to boot the device. It can be advantageous to ship a device to the customer with the backup BIOS on the hard drive so that if a future upgrade of the BIOS fails, if the BIOS becomes corrupted, or the like, a known, good, backup can be used.

However, putting a copy of the BIOS on a hard drive of a product that also ships with a software image including, for example, an operating system, can be a challenge to developers and manufacturers. A challenge that can arise is that imaged hard drives would need to wait to be imaged until after a final BIOS is developed and verified. BIOS changes can be useful to correct a variety of problems and/or to make a variety of improvements. As such, it can be advantageous to wait until a later time to finalize the BIOS than the software image.

Accordingly, various embodiments disclosed herein relate to storing backup firmware onto a storage unit such as a hard drive. The storage can be, for example, a hard drive with a software image such as an operating system image installed. The operating system can be initialized when a user, such as a customer, runs the software on the image. During the initialization of the operating system, a memory, such as a flag, can be set. The memory can be a non-volatile memory associated with the BIOS, a memory location associated with the BIOS, etc. Further, the memory can be used to indicate that on the next boot, the BIOS should be backed up to the storage unit.

During the boot process, the BIOS can check the memory location to determine whether the memory has been set. If set, the BIOS causes the device to back up the BIOS to a location, for example, a memory location of the storage unit. In certain examples, the location can be based on a specification and/or a standard. For example, the location and/or the storage unit can correspond to or be associated with the Unified Extensible Firmware Interface (UEFI) specification, the EFI specification, a proprietary specification, or the like. In certain examples, a single location on a hard drive or storage unit can be expected to be available to store the BIOS. In other examples, the location of the backup can be variable and stored in a non-volatile memory associated with the BIOS after backup. With the above approach, a manufacturer can update the BIOS of a device after a hard drive image for the device has been set and still have the capability to have a backup of the BIOS shipped with the system stored on the hard drive.

FIGS. 1A and 1B are block diagrams of computing devices that are capable of backing up firmware to a storage during a boot process if a flag has been set during initialization, according to various examples. Computing devices 100a, 100b include components that can be utilized to back up firmware to a storage unit. The respective computing devices 100a, 100b may be a notebook computer, a desktop computer, a tablet computing device, a wireless device, a server, a workstation, or any other computing device that uses firmware to boot up and transfer operation of the computing device to another operating system. In certain examples, the computing device 100a can include firmware 110, an initialization module 112, a boot module 114, a backup module 116, and a non-volatile memory 118. A computing device 100b can further include a storage unit 120, a processor 130, memory 132, input/output interfaces 134, one or more input device 140, one or more output device 142, etc.

The computing device 100 can include firmware 110. The firmware 110 can be stored on a non-volatile memory 118 of the computing device 100a. Non-volatile memory 118 can be electronic, magnetic, optical, or use another physical storage technology. Further, the non-volatile memory 118 can be implemented as Electrically Erasable Programmable Read-Only Memory (EEPROM), Flash memory, Programmable Read-Only Memory (PROM), non-volatile random-access memory (NVRAM), or the like. Moreover, the firmware 110 can comply with a standard or specification such as EFI or UEFI, a proprietary specification, or the like. Further, the firmware 110, for example, a BIOS, can include instructions that can be executed by the processor 130. In certain scenarios, certain parts of the non-volatile memory 118 can be used for the BIOS firmware instructions, while other associated non-volatile memory 118 is used for storing variables and/or flags that can be used in association with the firmware 110. The instructions can be used to initialize the computing device 100 and turn over the execution of the computing device 100 to an operating system.

In certain examples, during an initialization run, for example, a first run, of the computing device 100, the firmware 110 can turn over execution of the computing device 100 to the initialization module 112. The initialization module 112 can include instructions, that when executed by the processor 130, initializes an operating system and/or other applications on the computing device 100. As such, the initialization module 112 can be part of a first run mechanism that a manufacturer or another user of the computing device 100 installs onto the computing device 100. Further, the initialization of the operating system can include the customizing of one or more programs and/or drivers for a user. For example, the initialization can be used to set up an initial username and/or password, a registration of the computing device 100, etc. Further, initialization can include the unbundling, registration, and/or setup of other applications.

The initialization module 112 can be added to the computing device 100 as, for example, a software image placed on a storage unit 120 of the computing device 100. During initialization of the computing device 100, the initialization module 112 can set a flag or other memory in a non-volatile memory 118 of the computing device 100 to backup the firmware 110. The initialization module 112 can use a management instrumentation such as the Windows Management Instrumentation (WMI), a proprietary management instrumentation, or the like to set the non-volatile memory 118. In certain examples, a management instrumentation is a program that can be used to interface higher level programs such as an application running on an operating system with instrumented components, such as a non-volatile memory associated with the firmware 110. In certain scenarios, during the initialization process and/or after the initialization process has completed, the computing device 100 can be rebooted.

When the computing device 100 is booted, a boot module 114 can initiate a boot process executing on the processor 130. The boot process initializes interfaces of the computing device 100, such as input/output interfaces 134, storage interfaces, or the like. For example, an input interface of the computing device 100 can be connected to an input device 140 such as a keyboard, a mouse, a remote, a keypad, a touch interface, a microphone, or the like. Further, an output interface may be connected to an output device 142 such as a display, a speaker, an amplifier, a projector, a printer, a messaging device, or the like. During the boot process, the boot module 114 can determine whether the memory or flag indicating that the firmware should be backed up has been set. If the memory or flag has been set, the boot process can cause the backup module 116 to backup the firmware 110.

As such, the backup module 116 backs up the firmware 110 to a storage unit 120 during the boot process if the flag or memory has been set. In certain examples, the firmware 110 includes binary information of a BIOS or other boot firmware for the computing device 100 or a component of the computing device 100. The binary information can include instructions used by BIOS and/or default setting information. In certain scenarios, other setting information can be stored at another location and/or not be backed up. The backup module 116 can create a backup firmware based on the firmware to store on the storage unit 120 and cause storage of the backup firmware. In certain scenarios, the location of the backup firmware can be based on a standard or specification, such as the UEFI, a proprietary specification, etc. The backup module 116 can further modify the firmware 110 when generating the backup firmware. This can be done, for example, to clear one or more memory variables associated with the firmware 110 that may also be backed up. In certain scenarios, modification can be used to set the backup firmware with default setting information that may have been stored and/or updated on the firmware 110 during a previous boot.

In certain examples, the storage unit 120 is a fixed storage unit such as a hard drive, a removable unit such as a Universal Serial Bus (USB) storage drive, or external storage such as storage over a network device. In certain examples, a fixed storage system is a memory that is intended to be utilized as a permanent memory solution. A fixed storage system can include a single or multiple storage devices grouped for such a permanent memory solution. For example, fixed storage can include non-removable storage. The terms "fixed" and "non-removable" can be reflected for the intended purpose of the storage solution. Thus, both "fixed" and "non-removable" storage solutions can be removed for repair, maintenance, upgrade, etc. Examples of such fixed storage devices include hard drives, solid state drives, storage arrays or enclosures including at least one of the drives or disks, or the like. Further, in some examples, these storage devices may be determined to be fixed based on a difficulty to remove, replace, or repair the storage devices. Moreover, the terms "fixed" and "non-removable" can be utilized to differentiate between such devices and "removable" storage media such as tapes, floppy diskettes, compact disks, removable USB drives, etc.

In certain embodiments, a fixed or non-removable storage device such as an internal hard drive, an internal solid state drive, an internal or external enclosure, or the like can include a set of software or software image including instructions of the initialization module 112. Further, the backup firmware can be stored in the same storage device during the boot process. For example, the initialization of the computing device 100 can include creating a partition on the storage unit 120. The backup firmware can be stored on the partition.

A processor 130, such as a central processing unit (CPU) or a microprocessor suitable for retrieval and execution of instructions and/or electronic circuits can be configured to perform the functionality of any of the modules 112, 114, 116 described herein. In certain scenarios, instructions and/or other information, such as binary firmware information, can be stored in the memory 132 or other memory during the backup process. Moreover, in certain embodiments, some components can be utilized to implement functionality of other components described herein.

Each of the modules 112, 114, 116 may include, for example, hardware devices including electronic circuitry for implementing the functionality described herein. In addition or as an alternative, each module 112, 114, 116 may be implemented as a series of instructions encoded on a machine-readable storage medium of computing device 100 and executable by processor 130. It should be noted that, in some embodiments, some modules are implemented as hardware devices, while other modules are implemented as executable instructions.

FIG. 2 is a flowchart of a method for backing up firmware based on a request set during an initialization process, according to one example. Execution of method 200 can be implemented by a computing device, for example, computing device 100, or another computing device, such as computing device 400. Method 200 may be implemented in the form of executable instructions stored on a machine-readable storage medium, and/or in the form of electronic circuitry.

Method 200 may start at 202 and proceed to 204, where a computing device initializes an operating system to execute on the computing device. In certain examples, the computing device is a laptop, a desktop, a workstation, a server, or another computer that includes firmware to boot the computing device as well as a separate operating system. The initialization of the operating system can be used to prepare the operating system to run on the computer. Further, the initialization can be used to customize the computer for a new user. In the example of a personal computer, a new user can purchase the computer from a manufacturer or retail outlet. The personal computer can include a software image including an operating system and/or other programs. When the user turns on the computer, for example, for the first time, the computer can start executing instructions on the software image to prepare the computer for use with the user. Preparation can include, for example, registration of the personal computer, the operating system of the personal computer, registration of other programs, etc. Further, preparation can include the creation of a username and/or password for the user.

At 206, during the initialization process, the computer can set a memory, such as a non-volatile memory, to indicate a backup request for firmware of the computer. The firmware can include, for example, a BIOS, UEFI, etc. As such, the firmware may be used to boot the computer at 208. The computer can be rebooted or is otherwise reset. The reboot command can be a software warm reboot used during the initialization process. Additionally or alternatively, the computer can be shut down and started up. In certain examples, the memory can be set in volatile memory that is not reset during a warm reboot.

During the boot process, at 210, the computer can check the non-volatile memory to determine if the backup request is present. If the backup request is not present, the computer can continue to boot. In certain scenarios, if the backup request is not present, the computer can continue to boot.

If the backup request is present, the computer backs up the firmware associated with the request to a storage unit at 212. In certain examples, the firmware associated with the request can be considered usable firmware. In certain embodiments, usable firmware is firmware located at a memory, such as NVRAM, of the computer where the usable firmware can be executed to perform its intended function. In some examples, a usable firmware can be a BIOS that includes information stored at the first memory location executed by the processor. As noted above, the storage unit can be fixed or removable storage device. Further, the storage unit can be a fixed disk, such as a hard drive, that includes a software image, for example, information about an operating system that can be used to start the initialization process. The backup of the firmware can include creating a backup firmware image. The firmware image can be a binary image of the information included in the firmware. Additionally or alternatively, parts of the firmware image, which may include variable data, can be cleared or set to a default state. In certain scenarios, a portion of the firmware can include the default and/or clear states and/or memory locations that may need to be cleared. Then, the backup firmware image can be stored on the storage unit. In certain examples, the storage unit is a fixed disk and the backup firmware is stored on a partition. The partition can be saved exclusively for the backup firmware. Moreover, in certain scenarios, the backup firmware can be stored at a location based on a standard or specification, such as the UEFI specification, proprietary specifications, or the like.

The computer can continue to perform other functions, such as continuing to boot to an operating system. Additionally, the computer can clear the backup request. With this approach, the backup is performed once, when the operating system or system software is first initialized. Further, in certain scenarios, options to replace the backup firmware can be disabled in the firmware after the firmware is backed up once.

Figure 3:
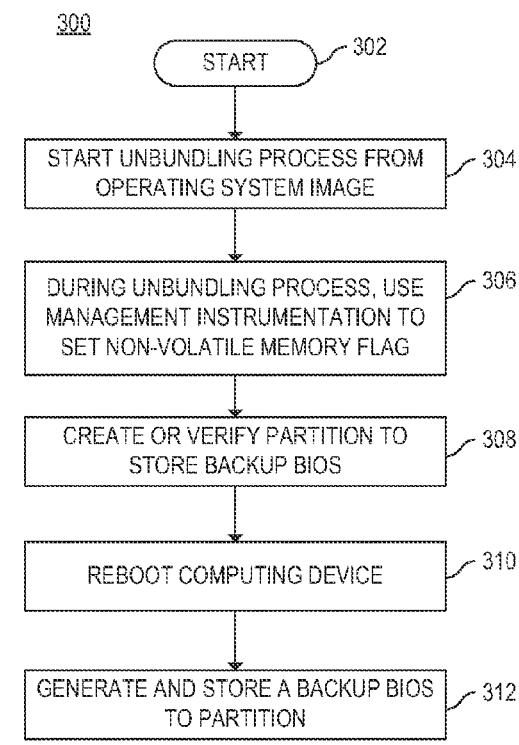
FIG. 3 is a flowchart of a method for backing up a Basic Input/Output System using an unbundling process, according to one example.

FIG. 3 is a flowchart of a method for backing up a Basic Input/Output System using an unbundling process, according to one example. Execution of method 300 can be implemented by a computer, for example, computing device 100, or another computing device, such as computing device 400. Method 300 may be implemented in the form of executable instructions stored on a machine-readable storage medium, and/or in the form of electronic circuitry.

Method 300 starts at 302, where the computer is in a state where it is ready to be set up. In certain scenarios, the computer can be in a state where it has an operating system installed, but not customized for a user. For example, the computer can be in a state where the user bought the computer from a manufacturer or retail outlet, but the computer has not yet been initialized by the user. The computer can be preloaded with a software image, for example, an image including an operating system and/or other bundled software that may need to be set up or initialized. As noted above, the manufacturer may wish to have a firmware image, such as a backup BIOS image stored on storage, such as a hard drive associated with the computer. However, it can be challenging to efficiently put the BIOS or firmware image on a preloaded storage while retaining the flexibility to change the BIOS or firmware.

When a customer buys the computer, the customer can turn on the computer. At 304, the computer starts an unbundling process from a system image. The system image can include an operating system and/or other software that can be executed by a processor of the computer. The unbundling process can include the initialization of the operating system and/or one or more software packages. The unbundling process can also be used to register the computer, the operating system, the software packages, etc. Further, the unbundling process may be used to customize user names, passwords, etc.

The software can be bundled together for the sale of the computer. A benefit of bundling the software together for a manufacturer is that the manufacturer can preload a software image including the operating system and software packages to the computer onto storage that comes with the computer. This process allows for a more streamlined manufacturing process. During the unbundling process, at 306, a management instrumentation such as WMI or a proprietary instrumentation can be used to set a non-volatile memory flag. In certain examples, a flag is one or more bits that are used to store a binary value or code that has an assigned meaning. In this scenario, when the flag is set, the assigned meaning is that if the flag is set, during a boot process, the computer backs up firmware, for example the BIOS of the computer.

At 308, the computer can create and/or verify that a partition is present to store a backup firmware, such as a BIOS. The creation/verification process can occur during the unbundling process, for example, when the flag is set. Additionally or alternatively, the creation/verification process can occur during a boot process controlled by a firmware of the computer.

At 310, the computer is rebooted. The reboot can be part of the unbundling process using a soft reboot and/or can be considered the next shutdown, boot up cycle of the computer. When the computer is booted, a boot process can be executed using a firmware or BIOS. The computer can check the memory location that was set to determine whether the memory location was set.

If the flag is set, the computer generates and stores a backup BIOS or firmware to the partition at 312. In certain embodiments, the backup includes creating a firmware image of the firmware and/or BIOS. The firmware image is then stored on the partition. In certain embodiments, the firmware image can be a binary copy of the current BIOS or firmware. In other embodiments, the firmware image can be a copy of the current BIOS or firmware with modifications. Modifications can include, for example, the clearing or setting of one or more memory locations to a default state. This information can be included in one or more firmware instructions used for backup. Further, in certain scenarios, the computer can clear the memory location that was set when the backup is made. Additionally or alternatively, to add security, the memory location can be set to another state, where a new BIOS cannot replace the backup BIOS stored on the partition.

The computer can continue other processing. For example, the computer can continue to boot to the operating system. With this approach, a backup BIOS or firmware can be stored on a storage associated with the computer without need for intervention of a user and without need for a manufacturer to place the backup on the storage during manufacturing.

Figure 4:
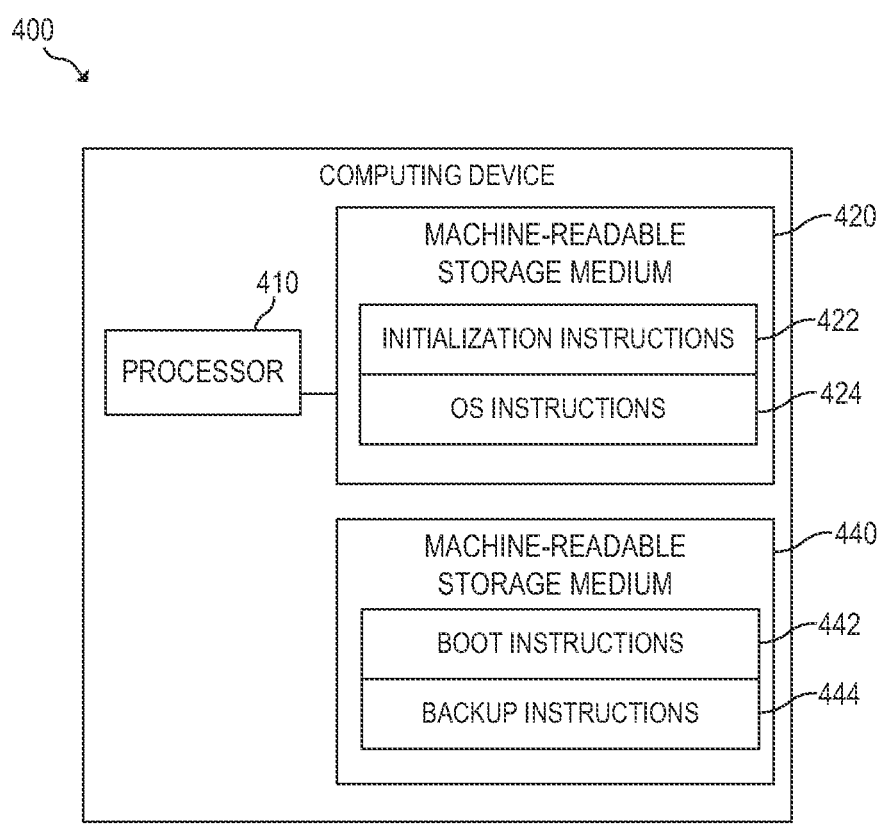
FIG. 4 is a block diagram of a computing device capable of creating a backup of a firmware of the computing device based on setting of a non-volatile memory during initialization of an operating system, according to one example.

FIG. 4 is a block diagram of a computing device capable of creating a backup of a firmware of the computing device based on setting of a non-volatile memory during initialization of an operating system, according to one example. The computing device 400 includes, for example, a processor 410, a machine-readable storage medium 420 including instructions 422, 424 for initializing the computing device 400 for usage, and a second machine-readable storage medium 440 including instructions 442, 444 for booting the computing device 400 and backing up firmware. In certain scenarios, the second machine-readable storage medium 440 includes firmware, such as a BIOS, to boot the computing device 400, backup the firmware to a storage, hand over control of the computing device 400 to an operating system, and/or perform other computing processes. Computing device 400 may be, for example, a notebook computer, a desktop computer, a server, a workstation, a slate computing device, or any other computing device with boot firmware separate from an operating system. In certain embodiments, boot firmware, such as a BIOS, can be considered the first code run by a computing device that subsequently turns over execution of the computing device to another software, such as an operating system. The boot firmware can also be used to initialize and identify system devices.

Processor 410 may be, at least one central processing unit (CPU), at least one semiconductor-based microprocessor, at least one graphics processing unit (GPU), other hardware devices suitable for retrieval and execution of instructions stored in machine-readable storage medium 420 or 440, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 442, 444 to implement perform various tasks, for example, methods 200 and 300. As an alternative or in addition to retrieving and executing instructions, processor 410 may include at least one integrated circuit (IC), other control logic, other electronic circuits, or combinations thereof that include a number of electronic components for performing the functionality of instructions 422, 424, 442, 444.

Machine-readable storage mediums 420, 440 may be any electronic, magnetic, optical, or other physical storage device that contains or stores executable instructions. Examples of machine-readable storage mediums include Random Access Memory (RAM), an Electrically Erasable Programmable Read-Only Memory (EEPROM), a storage drive, a Compact Disc Read Only Memory (CD-ROM), and the like. As such, the machine-readable storage mediums can be non-transitory. As described in detail herein, machine-readable storage medium 420, 440 may be encoded with a series of executable instructions for booting the computing device 400, initializing software on the computing device 400, and automatically backing up firmware of the computing device 400.

In one example, machine-readable storage medium 440 can include instructions pertaining to a boot firmware for the computing device 400. Further, boot instructions 442 can be executed to boot the computing device 400 into a usable state. During the execution of the boot instructions 442, the processor can look to see if a backup flag is set in a non-volatile memory of the computing device 400. If the backup flag is not set, the execution of the computing device 400 can be transferred to software stored on machine-readable storage medium 420. In certain examples, machine-readable storage medium 420 can be loaded with an operating system and/or other software.

In one example, the software can include initialization instructions 422. In certain examples, initialization instructions 422 are executed to customize the computing device 400 to a new entity, such as a user. The initialization instructions 422 can be used to initialize an operating system of the computing device 400. Examples of such an initialization include determining a username and/or password for the user, registering the computing device 400 and/or the operating system, registering another software package, loading drivers, or the like. As part of the initialization of the computing device 400, the processor 410 can set the backup flag in the non-volatile memory. Setting the backup flag causes the computing device, on next boot, to create a backup of a firmware to a storage unit. In certain examples, the firmware can include information contained in machine-readable storage medium 440. Further, in certain scenarios, the initialization instructions 422 can cause the computing device 400 to reset. In other scenarios, operating system (OS) instructions 424 can cause reset, or the computing device 400 can be shutdown and powered up.

On a subsequent boot, the boot instructions 442 are executed to perform a boot process. This time, when the processor 410 checks to see if the flag has been set, it is determined that the flag has been set. The determination that the flag has been set causes backup instructions 444 to be executed. The backup instructions can be used to create a backup of the firmware. As noted above, a backup can include binary information of the firmware. Further, the firmware backed up can be considered usable firmware. The backup instructions 444 can also be used to store the backup onto the storage unit. In certain scenarios, the storage unit can be machine-readable storage medium 420. For example, the machine-readable storage medium 420 can be a fixed disk that allows for such storage. In some examples, the initialization instructions 422 and/or the backup instructions

444 can be used to create and/or verify a partition on the storage unit where the backup can be stored. The creation and/or verification of the partition can be based on a standard or specification, for example, EFI, UEFI, proprietary specifications, or the like. As such, the backup may be used to restore a firmware image and/or used for booting the computing device 400.

What is claimed is:

1. A computing device comprising:
a first non-volatile memory including firmware;
initialization instructions executable in the computing device to perform an initialization comprising initializing an operating system from an operating system image and registering the computing device with a seller of the computing device during a first run of the computing device, wherein during the initializing of the operating system, the initialization instructions are executable to set a non-volatile memory flag to backup the firmware;
boot instructions executable to boot the computing device using a boot process after a reboot of the computing device performed following the setting of the non-volatile memory flag, the boot process based on the firmware in the first non-volatile memory; and
backup instructions executable in the computing device to automatically backup the firmware to a second non-volatile memory during the boot process in response to the non-volatile memory flag being set.

2. The computing device of claim 1, wherein the firmware includes binary information of a Basic Input/Output System.

3. The computing device of claim 2, wherein the backup instructions are executable to create a backup firmware to store on the second non-volatile memory during the backup process.

4. The computing device of claim 3, wherein the backup instructions are executable to modify the backup firmware to include setting information.

5. The computing device of claim 1, wherein the initialization further comprises creating a partition on the second non-volatile memory,
wherein the second non-volatile memory is a fixed disk, and
wherein the backup firmware is stored on the partition.

6. The computing device of claim 1, wherein the initialization instructions are executable to use a management instrumentation to set the non-volatile memory flag during the initializing of the operating system.

7. The computing device of claim 1, wherein the initialization further comprises unbundling of one or more applications.

8. The computing device of claim 1, wherein the initialization during the first run further comprises customizing the computing device for a user of the computing device, the customizing comprising receiving input information from the user.

9. The computing device of claim 1, wherein the first run of the computing device is the first run following purchase of the computing device.

10. A method comprising:
performing initialization of a computing device during a first run of the computing device, the initialization comprising:
initializing an operating system of the computing device, and
registering the computing device with a seller of the computing device;
during the initialization, automatically setting a flag in a non-volatile memory to indicate a backup request;
after a reboot of the computing device following the setting of the flag in the non-volatile memory, booting the computing device including checking the non-volatile memory to determine if the flag is set; and
in response to the flag being set, backing up a firmware of the computing device to a storage unit.

11. The method of claim 10, wherein backing up the firmware comprises:
creating a backup firmware image, and
storing the backup firmware image on a partition of the storage unit.

12. The method of claim 11, wherein the initialization comprises an unbundling process of a software image including the operating system and an application.

13. The method of claim 12, wherein the software image is included on the storage unit.

14. At least one non-transitory machine-readable storage medium storing instructions that, when executed by at least one processor of a device, cause the device to:
perform initialization comprising initializing an operating system from an operating system image and registering the device with a seller of the device during a first run of the device;
during the initializing of the operating system, set a flag in a non-volatile memory of the device and
boot the device after a reboot of the device following the setting of the flag in the non-volatile memory, the booting of the computing device comprising automatically creating a backup of a firmware of the device in a storage unit in response to the flag being set.

15. The at least one non-transitory machine-readable storage medium of claim 14, further comprising instructions that, when executed by the at least one processor, cause the device to:
boot the device via a boot process; and
during the boot process, check the non-volatile memory to determine whether the flag has been set.

16. The at least one non-transitory machine-readable storage medium of claim 15,
wherein the initializing of the operating system includes creation of a partition of the storage unit,
and wherein the backup of the firmware is stored on the partition.

17. The at least one non-transitory machine-readable storage medium of claim 14, wherein the initialization further comprises customizing the device for a user of the device, the customizing comprising receiving input information from the user.

* * * * *